Aug. 16, 1938. H. SEEGERS Re. 20,830

PRESSURE GAUGE

Original Filed Oct. 4, 1934 2 Sheets-Sheet 1

Inventor:
Hans Seegers
By Jones, Addington, Amos & Seibold
Attys.

Aug. 16, 1938. H. SEEGERS Re. 20,830

PRESSURE GAUGE

Original Filed Oct. 4, 1934 2 Sheets-Sheet 2

Inventor:
Hans Seegers.
By Jones, Addington, Ames & Fishel.
Attys.

Reissued Aug. 16, 1938 Re. 20,830

UNITED STATES PATENT OFFICE 20,830

PRESSURE GAUGE

Hans Seegers, Chicago, Ill., assignor to Jas. P. Marsh Corporation, Chicago, Ill., a corporation of Illinois Original No. 2,100,754, dated November 30, 1937, Serial No. 746,802, October 4, 1934. Application for reissue June 30, 1938, Serial No. 216,680

12 Claims. (Cl. 73—109)

This invention relates to gauges, and more particularly to so-called "zero adjustment gauges" in which the hand or other indicator which is actuated by a pressure responsive element or other suitable mechanism may be easily and conveniently adjusted to "zero" position upon the graduated dial of the gauge.

My invention is particularly adapted for use in connection with substantially all types of pressure gauges that are employed in connection with household and commercial compressors such as are used in the refrigeration art.

One object of my invention is to provide a pressure gauge, particularly for testing in field service work, which will not easily get out of order and which may be easily adjusted to zero position and which is provided with a relatively wide range of adjustment.

Another object of my invention is to provide a pressure gauge having a zero adjustment accessible from outside the casing, or at least accessible without disassembling the gauge mechanism.

Another object is to provide a zero adjustment gauge in which it is substantially impossible to injure the device by any operation of the adjusting means.

A further object is the provision of a zero adjustment gauge having a wide range of adjustment and which is of comparatively few parts, cheap to manufacture, easy to assemble, and which will not easily get out of order.

Another object of my invention is to provide a gauge, whether adapted for measuring pressures or otherwise, which incorporates the adjusting features herein described and which may be assembled as a unit and mounted as a unit within the gauge casing or housing.

Further objects will be apparent from the specification and the appended claims.

Figures 1, 2, 3, 4:
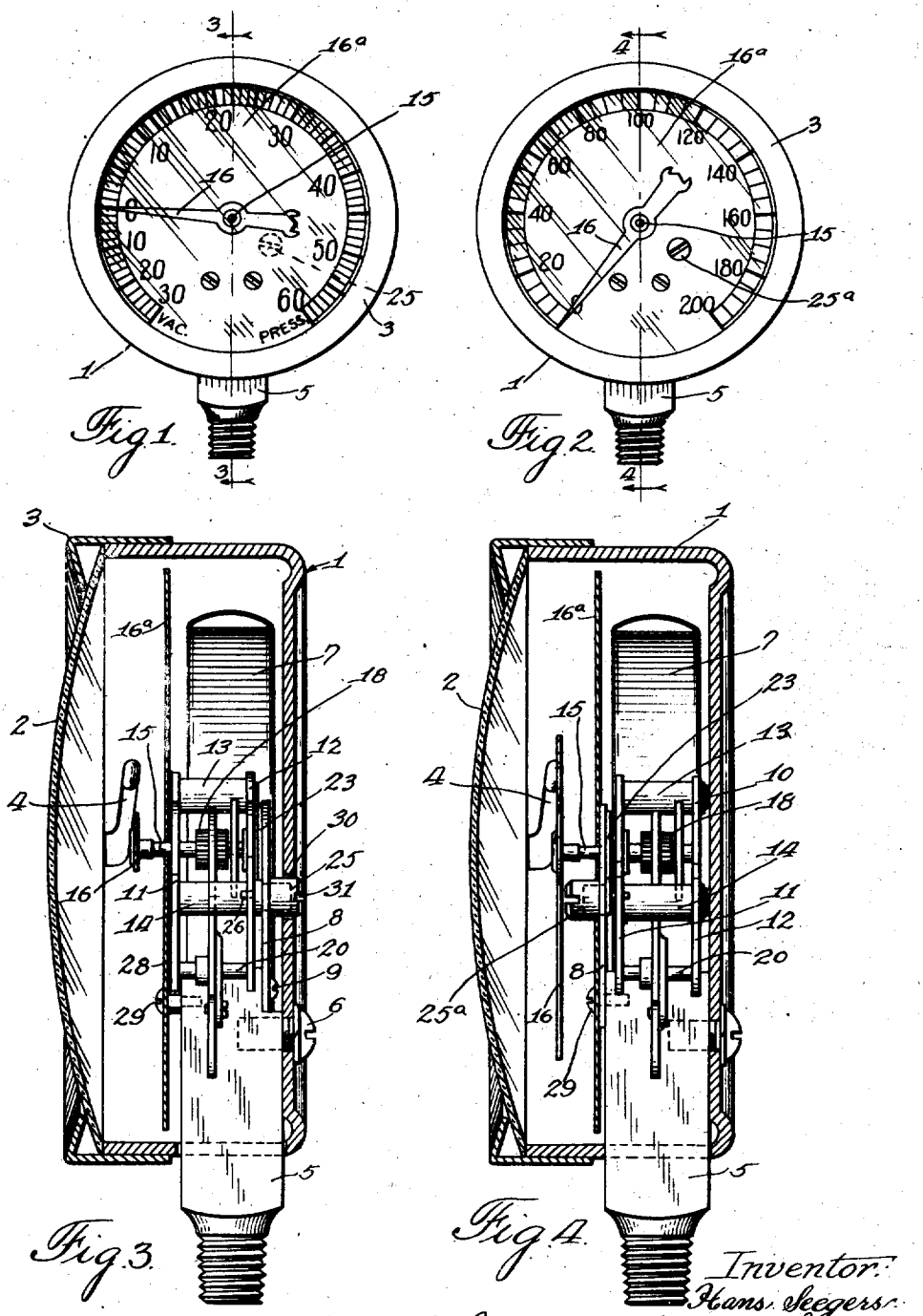
Figure 1 is a front elevation of an embodiment of the invention having a dial graduated for vacuum and pressure readings and provided with means whereby an adjustment of the indicator may be accomplished from outside the casing.
Fig. 2 is a front elevation of an embodiment similar to that illustrated in Fig. 1, except that the dial is graduated for pressure reading only and the indicator adjustment means is accessible from the front of the dial.
Fig. 3 is a vertical transverse section through the embodiment illustrated in Fig. 1 and taken on a line corresponding substantially to the line 3—3 of Fig. 1, the indicator transmission and adjusting mechanism therefor being shown in full lines.
Fig. 4 is a vertical section similar to Fig. 3 but taken on a line corresponding to line 4—4 of Fig. 2.

Referring to the embodiment of my invention illustrated particularly in Figs. 1, 3, 5, 6, and 7, the gauge comprises a casing 1 having a transparent cover 2 which is retained in position by means of a retaining ring 3. This ring is arranged to telescope the casing 1 and is retained in position by means of a bayonet slot and pin connection, as illustrated at 4. A vertical post or tubular fitting 5 extends through an opening in the bottom of the casing 1 which is secured to the fitting 5 by means of a screw 6. The fitting 5 has the usual passage therein communicating with a Bourdon expansible and contractible tube 7 such as commonly used in pressure gauges and which is secured in any suitable manner to the fitting whereby the tube is in communication with the passage through the fitting in the usual manner.

Figure 6:
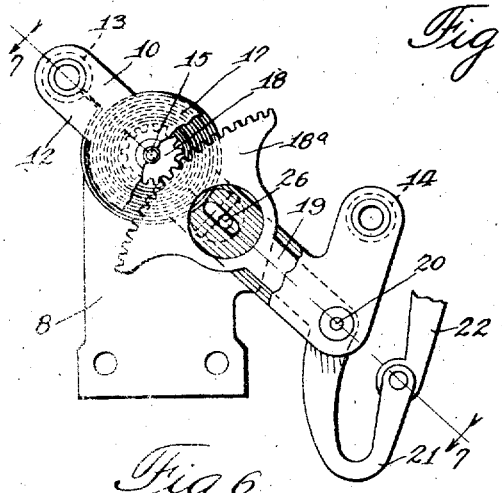
Fig. 6 is an enlarged front elevation of the operating mechanism illustrated in Fig. 5 with a portion of the adjustable transmission frame broken away for purposes of illustration.
Figure 7:
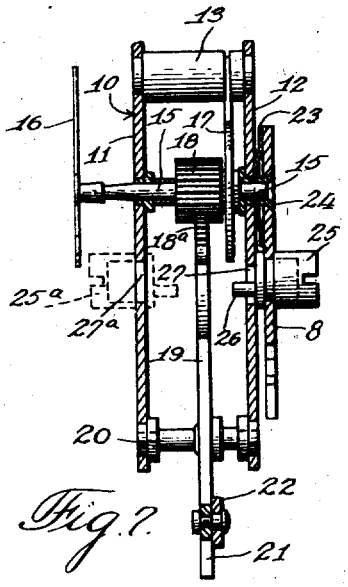
Fig. 7 is a sectional view through the adjustable transmission mechanism and taken on a line corresponding to line 7—7 of Fig. 6.

An indicator operating mechanism, to be hereinafter described, is assembled as a unit, as shown in Figs 6 and 7, and is connected to the free end of the Bourdon tube 7 and is mounted on a support 8 which is, in turn, rigidly but detachably secured to the fitting 5 by any suitable means, such as screws 9. The indicator operating mechanism comprises a shiftable frame 10, which in the embodiment illustrated comprises two spaced parallel side plates 11 and 12 that are permanently secured together by suitable spacing posts 13 and 14.

An indicator shaft 15 is rotatably mounted in this frame 10 by being journalled in the plates 11 and 12 and extends outwardly to support an indicating hand 16. The shaft 15 is provided with the usual hair spring 17 secured thereto and to the frame 10, all in the well-known manner, as shown in Fig. 6. The indicator 16 plays over a graduated dial 16a in the well-known manner.

Figure 5:
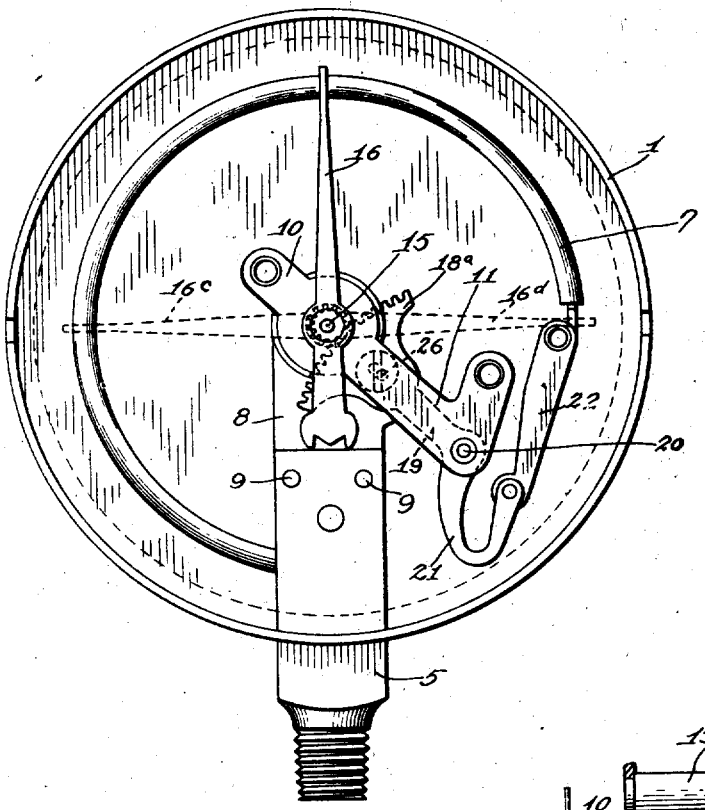
Fig. 5 is a front elevation of the embodiment illustrated in Fig. 1 with the transparent cover and dial removed and the indicator positioned to illustrate the range of adjustment.

The shaft 15 is also provided with a pinion 18 fixed thereon co-operating with a gear segment 18a integrally formed on a lever 19, which latter is pivotally mounted in the frame 10 at 20. The lever 19 is provided with an integrally formed gooseneck arm 21 that is flexibly connected to the Bourdon tube 7 by means of a link 22, as shown in Figs. 5 and 6.

The frame 10, comprising the front plate 11 and the rear plate 12 and the associated elements comprising the indicator operating mechanism, is so mounted upon the detachable support 8 as to be rotatably adjusted about the fixed axis of the indicator shaft 15. Thus, the position of the indicator 16 may be adjusted in any position, within limits, relative to the graduations formed upon the dial face 16a. In other words, when the frame 10 is rotated with respect to the fixed, detachably mounted support 8 about an axis coincident with the fixed axis of rotation of the shaft 15, and since the shaft 15 and indicator 16 are mounted upon the frame 10, the indicator 16 is thus capable of being adjusted with respect to the fixed dial face 16a whereby "zero adjustment" of the gauge may be effected.

Rotation of the frame 10 as aforesaid is effected in the following manner: As shown in Figs. 3 and 7, a spring washer 23 may be interposed between the rear plate 12 of the frame 10 and the support 8, and these members are rotatably secured together by means of an eyelet 24, which latter serves to form a bearing for the shaft 15, as illustrated in Fig. 7. It will therefore be seen that when the frame 10 and its associated mechanism, comprising the shaft 15 and the indicator 16, are rotated upon the eyelet 24, the indicator 16 will be moved relative to the Bourdon tube 7. As shown in Fig. 6, the indicator 16 is operatively connected to the Bourdon tube 7 through the link 22, the gear segment 18a, the pinion 18, and the shaft 15, all of which elements, excepting the link 22, being mounted upon the frame 10. When the frame 10 is rotated about the eyelet 24, the compensating action of the aforesaid assembly of elements will cause the indicator 16 to be rotated in the same direction as the frame 10 without disturbing the normal functioning of the Bourdon tube 7. As a result, the indicator 16 is therefore capable of being adjusted over a wide range by imparting a small rotatable movement to the frame 10.

The frame 10 is rotatably mounted upon the detachable supporting plate 8 in the following fashion: A stud 25, exteriorly accessible at the rear of the gauge casing, is frictionally mounted for rotation in the supporting plate 8 and is provided with an inwardly extending pin 26 that is eccentrically mounted on the inner end of the stud 25. This pin extends through an elongated narrow slot 27 formed in the rear plate 12. The slot 27 is of sufficient length so that the stud 25 may be completely rotated in either direction, whereby the frame 10 is likewise rotated in either direction about its axis which coincides with that of the eyelet 24 and of the indicator shaft 15. Because of the fact that the indicator 16 and the mechanism controlling its operation are mounted upon the frame 10, and since the Bourdon tube 7 is flexibly connected through the link 22 to the gear segment 18a, the indicator 16 may thus be rotatably adjusted through a comparatively wide range indicated, for example, by the dotted lines 16c and 16d shown in Fig. 5. It is to be noted in Fig. 5 that the indicator 16, shown in full lines, is not at the zero position indicated on the dial of Fig. 1, but is positioned vertically for the purpose of clearly illustrating the range of adjustment that is available. Obviously, this range of adjustment is dependent upon the degree of eccentricity of the pin 26 with respect to the axis of the stud 25.

Any suitable dial may be used in connection with the mechanism just described, and the dial may be graduated in any desired manner. The gauge is equally adaptable for use as a vacuum or pressure gauge, and the dial may be graduated accordingly. In other words, the dials illustrated in Figs. 1 and 2 may be interchangeably used and may be secured to the fitting 5 by any suitable means, such as the screws 29.

When the mechanism is assembled in a case, as illustrated in Fig. 3, the adjusting stud 25 extends through an opening 30 in back of the case and is exteriorly accessible of the case, the stud being provided with a slot 31 whereby a screw driver or other means may be used for adjustment.

The embodiment illustrated in Figs. 2 and 4 is similar to that just described, and the same reference characters are applied thereto, except that the support 8 is mounted on the front side of the fitting 5. But the frame 10 is mounted on this support in the same manner as previously described and as illustrated in Fig. 7. Here the eyelet 24 provides a front bearing for the indicator shaft 15 rather than the rear bearing, as illustrated in Fig. 7.

The frame plate members 11 and 12 may be made interchangeable by providing each with a slot 27 to receive the pin 26 so that the support 8 and the adjusting stud 25 may be positioned on either side of the fitting 5 and the same adjustment may be accomplished with equal facility and in the same manner. In the embodiment shown in Figs. 2 and 4, the stud 25a will be in the position indicated in full lines in Fig. 4 and in dotted lines in Fig. 7, and in this position the pin 26 will extend through a slot in the frame plate 11 corresponding to the slot in the frame plate 12. In this embodiment the stud 25a is within the casing. However, it extends through a suitable opening in the dial and is easily accessible by removing the retaining ring 3 and the transparent cover 2.

The herein described adjusting mechanism provides a reversing transmission between the stud 25 and the frame 8, which transmission may be a pin and slot connection as shown or its equivalent. The term "reversing transmission", as used herein and in the claims, is intended to mean a transmission which automatically reverses the direction of movement of the frame and may reciprocate the pointer when the adjusting means is moved in one direction.

In either of the embodiments herein described and illustrated the adjusting stud may be completely and continually rotated in either direction, and the indicator will merely oscillate through the range indicated by dotted lines in Fig. 5, it being understood, of course, that the range of adjustment may be within desired limits in accordance with the eccentric position of the pin 26 on the stud 25. By this construction it is impossible to injure the device by continued rotation of the stud, nor can the accuracy of the instrument be impaired.

Various modifications may be made without departing from the spirit of the invention, and it is desired, therefore, that the invention be limited only by the prior art and the scope of the appended claims. For example, my invention is not necessarily limited to pressure gauges per se incorporating Bourdon elements, but is applicable to gauges of many forms that embody any suitable actuator for the indicator or pointer and wherein adjustment of the pointer over the face of the graduated dial may be accomplished.

Having thus described my invention, what is claimed and desired to be secured by Letters Patent is:

1. In a pressure gauge of the character described, a fitting for supporting said gauge and for connection with a pressure line, a pressure responsive element connected to said fitting, a graduated dial, a pointer arranged to move over said dial, and an indicator-operating mechanism assembled as a unit for actuating said pointer in response to said pressure element, said indicator-operating mechanism comprising a support detachably secured to said fitting, a transmission between said pressure element and said pointer, said transmission being mounted in a frame and said frame being pivotally mounted upon said support at the axis of said pointer, and a rotatable adjusting member mounted on said detachable support and having an eccentric portion co-operating with said frame to move said frame and thereby to adjust said pointer by rotary movement of said adjusting member.

2. In a pressure gauge of the character described, a fitting for supporting said gauge and for connection to a pressure line, a Bourdon element connected to said fitting, a graduated dial having a zero graduation, a pointer arranged to move over said dial, and an indicator-operating mechanism assembled as a unit for actuating said pointer in response to said Bourdon element, said indicator-operating mechanism comprising a support detachably secured to said fitting, a transmission between said Bourdon element and said pointer, said transmission being mounted in a frame and said frame being pivotally mounted upon said detachable support at the axis of said pointer, said pointer being journaled in said frame, and rotatable adjusting means embodying an eccentric mounted on said detachable support and co-operating with said frame whereby said pointer may be adjusted to the zero graduation upon said dial, the latter being disposed in juxtaposition to said pointer.

3. In a gauge of the character described, a fitting for supporting said gauge, an actuator connected to said fitting, a graduated dial, a pointer adapted to play over said dial, and an indicator-operating mechanism assembled as a unit for actuating said pointed in response to said actuator, said indicator-operating mechanism comprising a support detachably secured to said fitting, a transmission connected between said actuator and said pointer, said transmission being mounted in a frame and said frame being pivotally mounted upon said support at the axis of said pointer, and exteriorly accessible rotatable adjusting means embodying an eccentric connection that engages said frame and is mounted in fixed relation to said detachable support whereby adjustment of said pointer over said dial may be effected.

4. In a gauge of the character described, a fitting for connection to a pressure line, a pressure responsive element connected to said fitting, an indicator, and an indicator-operating mechanism assembled as a unit for actuating said indicator in response to said pressure reponsive element, said indicator-operating mechanism comprising a support detachably secured to said fitting, a transmission connected between said pressure element and said indicator, said transmission being mounted in a frame and said frame being pivotally mounted upon said support, and means rotatable in either direction mounted on said detachable support to co-operatively engage said frame whereby the latter may be moved in two directions with a one-directional movement of said rotatable means to adjust the relative position of said indicator independently of said pressure responsive element.

5. In a gauge of the character described, a fitting for supporting said gauge, a pressure responsive element connected to said fitting, an indicator movable on an axis, and an indicator-operating mechanism assembled as a unit for actuating said indicator in response to said pressure element, said indicator-operating mechanism comprising a support detachably secured to said fitting, a transmission secured between said pressure element and said indicator, said transmission being mounted in a frame and said frame being adjustably mounted upon said support at the axis of said indicator, and rotatable means mounted on said detachable support adjacent one side of said frame and operatively related thereto to move said frame in two directions about the axis of said indicator with a one-directional movement of said rotatable means, thereby to adjust the relative position of said indicator independently of said pressure responsive element.

6. In a gauge of the character described, a fitting for supporting said gauge, a pressure responsive element connected to said fitting, an indicator, and an indicator-operating mechanism assembled as a unit for actuating said indicator in response to said pressure element, said indicator-operating mechanism comprising a support detachably secured to said fitting, a transmission between said pressure element and said indicator, said transmission being mounted in a frame and said frame being adjustably mounted upon said support, and means rotatable in either direction and operably connected to said frame to move said transmission and indicator independently of said pressure responsive element, thereby to adjust in either direction the position of said indicator, said means being mounted on said detachable support to enable unlimited rotation in either direction.

7. In a gauge of the character described, a fitting for supporting said gauge, an indicator, movable means responsive to a variable physical condition, and an indicator-operating mechanism assembled as a unit for actuating said indicator to cause movement thereof in accordance with the variations in the said physical condition, said indicator-operating mechanism comprising a support detachably secured to said fitting, a transmission connected between said movable means and said indicator, said transmission, being mounted in a frame and said frame being pivotally mounted upon said support, and means mounted on said detachable support for unlimited movement in two directions, said last means being connected to said indicator through said transmission for moving said indicator over its adjustment range when said last means is moved in either direction.

8. In a pressure gauge of the character described, a fitting for supporting said gauge, a pressure responsive element connected to said fitting, a dial, an indicator arranged to move over said dial, and an indicator-operating mechanism assembled as a unit for actuating said indicator in response to said pressure element, said indicator-operating mechanism comprising a support detachably secured to said fitting, means on said support and mounted for unlimited rotation in either direction, a transmission between said means and said indicator to adjust said indicator relative to said pressure responsive element and independently thereof when said means is rotated in either direction.

9. In a pressure gauge of the character described, a fitting for supporting said gauge and for connection with a pressure source, a pressure responsive element connected to said fitting, a graduated dial, a movable indicator responsive to said pressure responsive element for indicating pressure in accordance with said graduations and having a predetermined adjustment range relative to said graduations, and an indicator-operating mechanism assembled as a unit and arranged to move said indicator, said indicator-operating mechanism comprising a support detachably secured to said fitting, means on said support and mounted for unlimited rotation in either direction, and a transmission between said rotatable means and said indicator whereby said indicator may be moved completely over said adjustment range in both directions when said means is rotated in either direction.

10. In a gauge of the character described, a fitting for supporting said gauge, an indicator, an indicator-controlling means, and an indicator-operating mechanism assembled as a unit, said indicator-operating mechanism comprising a support detachably secured to said fitting, a frame pivotally mounted on said support, said indicator being pivotally mounted on the axis of said frame, a transmission operatively associated with said indicator and arranged for operative connection to said indicator-controlling means, and an adjusting means mounted upon said support and engaging said frame, said adjusting means and said frame being constructed and interconnected to provide an eccentric pin and slot connection therebetween.

11. In a gauge of the character described, a fitting for supporting said gauge, an element responsive to variations in a physical condition, an indicator, and an indicator-operating mechanism assembled as a unit for causing said indicator to move commensurably with said variations, said indicator-operating mechanism comprising a support detachably secured to said fitting, a frame mounted on said support for movement in a plurality of directions to vary the location of the indicating range of said indicator, means on said frame co-operating with said elment and said indicator to move said indicator, an adjusting device mounted on said support, and a reversing transmission between said adjusting device and said frame to move said frame in a plurality of directions when said adjusting device is moved in one direction.

12. In a pressure gauge of the character described, a fitting for supporting said gauge and for connection with a pressure line, a pressure responsive element connected to said fitting, a graduated dial, a pointer arranged to move over said dial, and an indicator-operating mechanism assembled as a unit for actuating said pointer in response to said pressure element, said indicator-operating mechanism comprising a support detachably secured to said fitting, a transmission between said pressure element and said pointer, a movable frame mounted upon said support, said transmission being mounted on said frame, manually movable means on said support and adjustable in two directions, and a reversing transmission between said manually movable means and said frame to enable said pointer to be reciprocated over a predetermined range by movement of said means in either direction.

HANS SEEGERS.